US008403498B2

(12) United States Patent
Kotaka et al.

(10) Patent No.: US 8,403,498 B2
(45) Date of Patent: Mar. 26, 2013

(54) PROJECTOR, AND ITS FILTER RENEWAL CONTROL METHOD

(75) Inventors: Mitsuru Kotaka, Osaka (JP); Shigekazu Yamagishi, Osaka (JP); Yoshinobu Nakajima, Kyoto (JP); Toshiyuki Noguchi, Hyogo (JP); Yoshinari Matsumoto, Osaka (JP); Kenji Kunitake, Osaka (JP)

(73) Assignee: Panasonic Corporation, Osaka (JP)

( * ) Notice: Subject to any disclaimer, the term of this patent is extended or adjusted under 35 U.S.C. 154(b) by 656 days.

(21) Appl. No.: 12/594,884

(22) PCT Filed: Jan. 31, 2008

(86) PCT No.: PCT/JP2008/051517
§ 371 (c)(1),
(2), (4) Date: Oct. 6, 2009

(87) PCT Pub. No.: WO2008/129888
PCT Pub. Date: Oct. 30, 2008

(65) Prior Publication Data
US 2010/0128230 A1    May 27, 2010

(30) Foreign Application Priority Data
Apr. 12, 2007   (JP) .................. 2007-104764

(51) Int. Cl.
*G03B 21/26* (2006.01)
(52) U.S. Cl. ........................................ 353/55
(58) Field of Classification Search ............. 353/55; 96/429; 348/744
See application file for complete search history.

(56) References Cited

U.S. PATENT DOCUMENTS

| 5,236,477 | A  | * | 8/1993 | Koketsu ............... 96/417 |
| 6,168,646 | B1 | * | 1/2001 | Craig et al. ............ 95/14 |
| 2002/0030794 | A1 | * | 3/2002 | Hosoda et al. ......... 353/57 |
| 2006/0065125 | A1 | * | 3/2006 | Horiguchi et al. ...... 96/419 |
| 2006/0209267 | A1 | * | 9/2006 | Hirosawa et al. ....... 353/58 |

FOREIGN PATENT DOCUMENTS

| JP | 05-057120 | 3/1993 |
| JP | 6-059247 A | 3/1994 |

(Continued)

*Primary Examiner* — Thanh Luu
*Assistant Examiner* — Danell L Owens
(74) *Attorney, Agent, or Firm* — Hamre, Schumann, Mueller & Larson, P.C.

(57) ABSTRACT

A housing (17) that accommodates a light source (1), a display device (3), etc. has an intake aperture (18) and an exhaust aperture (24). A blowing unit (16, 23) sucks air in through the intake aperture and expels air out through the exhaust aperture. A filter unit (19) is disposed so that a filter (20) faces the intake aperture in a predetermined area between a rolling shaft (31*a*) and a take-up shaft (31*b*). A part of the filter facing the intake aperture is renewed by taking-up the filter from the rolling shaft onto the take-up shaft. A control unit (36) performs control so as to renew the filter for a range that is smaller than an opening area of the intake aperture, when a predetermined renewal condition is determined to be satisfied, based on the output of a detection unit (38, 39*a*, 39*b*) that detects a specific factor value relating to contamination of the filter, such as a cumulative display time, a temperature, an air pressure, etc. This reduces a noise occurring during the driving of a fan or a change in the rotational speed of the fan, which are associated with automatic filter renewal.

12 Claims, 8 Drawing Sheets

FOREIGN PATENT DOCUMENTS

| | | |
|---|---|---|
| JP | 06-060193 | 8/1994 |
| JP | 6-060193 U | 8/1994 |
| JP | 6-221599 A | 8/1994 |
| JP | 6-246120 A | 9/1994 |
| JP | 8-152242 A | 6/1996 |
| JP | 9-147543 A | 6/1997 |
| JP | 10-099627 | 4/1998 |
| JP | 2001-117165 | 4/2001 |
| JP | 2006-91612 | 4/2006 |
| JP | 2006-223958 | 8/2006 |

* cited by examiner

PROJECTOR, AND ITS FILTER RENEWAL CONTROL METHOD

TECHNICAL FIELD

The present invention relates to a projector equipped with a fan that introduces air into the projector in order to cool devices accommodated therein, and in particular relates to a control procedure for renewing a filtration area of a filter that is disposed at an intake aperture for the removal of dust in air.

BACKGROUND ART

Projectors using display devices (spatial optical modulators) such as liquid crystal display devices or DMDs (digital mirror devices) are capable of displaying images on a large screen, while they are compact and light in weight. In such projectors, an intense light from a light source is focused on a liquid crystal panel or DMD, modulated in accordance with an image signal, and enlarges and projects an image formed on the display device, thereby obtaining a high-quality large screen.

Also, increased brightness and improved quality year by year recently have allowed images on a large screen to be observed without dimming from extraneous light.

In the interior of such projectors, there are a large number of devices, such as lamps or light sources, liquid crystal panels, polarizers, and DMDs, that are required to be kept in a prescribed temperature range in order to offer the desired performance and to ensure reliability for long-term use. For example, because the display device is exposed to intense light and because the light source, a device power source, etc., generate a large amount of heat by themselves, the absence of appropriate cooling not only influences image quality but also causes thermal breakdown.

For this reason, projectors generally are equipped with an intake aperture and an exhaust aperture in a device housing, each port having a fan; and have a structure in which air is drawn into the interior of the projector through the intake aperture and then, after cooling each device, expelled out through the exhaust aperture.

However, dust is drawn in along with air from outside the device, and the attachment of such dust to the display device and to the periphery of the light source causes a reduction in brightness and color irregularities. For this reason, a sponge-like filter is disposed in the intake aperture for removing dirt or dust from taken-in air to obtain fresh air. In the case of a mainstream urethane filter, filter cleaning is required every several hundred hours.

In order to eliminate user inconveniences such as cleaning and exchange, a structure as disclosed in Patent Document 1 is desirable, for example. Patent Document 1 discloses a device having a function of automatically renewing an air filter that is mounted to electronic equipment for dust or oil filtration. Specifically, filtration is performed using a long filter roll by disposing a new part of the filter in the intake aperture. Under the control of this device, when contamination (clogging) of the filter is detected, a dirty part of the filter is taken-up automatically so that a new part of the filter is disposed over the entire intake aperture.

Patent Document 1: JP6-246120A

DISCLOSURE OF INVENTION

Problem to be Solved by the Invention

However, the following problem arises in the case of using the control method as in the conventional example described above, in which a new part of the filter is disposed over the entire aperture every time the filter is taken-up. Specifically, the amount of fresh air taken into the interior of the projector changes greatly between the state where the filter is at its dirtiest immediately before the filter is taken-up and a state where a new part of the filter is disposed over the entire aperture immediately after the filter has been taken-up, so as to cause a great change in the internal temperature of the projector.

In general, projectors are provided with a temperature sensor that detects the temperature conditions in the interior of the projector, or an air pressure sensor that detects air volume conditions in the interior of the projector. Based on the output detected by such sensors, the rotational speed of a fan is controlled. For example, when a high temperature in the interior of the projector is detected or when it is determined, based on the detection output of the air pressure sensor, that there is a reduction in the amount of air taken into the interior due to contamination of the filter, the fan is controlled so as to increase the rotational speed of the fan, thereby increasing the cooling effect.

Accordingly, the rotational speed of the fan reaches its maximum, for example when the filter is at its dirtiest immediately before the filter is taken-up, or when the internal temperature of the projector reaches its maximum for any reason, etc. Along with this, the starting sound of the fans becomes loud, making noise.

Also, the rotational speed of the fan changes greatly between the state immediately before the filter is taken-up and the state immediately after the filter is taken-up and renewed so that a new part of the filter is disposed over the entire aperture, because the internal temperature conditions of the projector or the amount of air in the interior of the projector change greatly therebetween. As a result, a change in noise that is unpleasant to a user occurs.

The present invention is intended to solve the above-described problems, and its object is to provide a projector that minimizes noise occurring during the driving of a fan or an unpleasant change in sound caused by a change in the rotational speed of the fan, which are associated with automatic filter renewal performed during long-term use.

Another object of the present invention is to provide a control method for such filter renewal in a projector.

Means for Solving Problem

A projector according to the present invention includes a light source; a display device that modulates incident light; an optical projection system that causes light from the light source to enter the display device and enlarges and projects an image modulated by the display device; a main unit housing that accommodates the light source, the display device, and the optical projection system and has an intake aperture and an exhaust aperture; a blowing unit for drawing air in through the intake aperture and expelling the air out through the exhaust aperture; a filter unit disposed so that a filter faces the intake aperture in a predetermined area between a rolling shaft and a take-up shaft, and having a structure in which a part of the filter facing the intake aperture is renewed by taking-up the filter from the rolling shaft onto the take-up shaft; a factor detection unit that detects a specific factor value relating to contamination of the filter; and a control unit that controls the operations of the light source, the display device, the blowing unit, and the filter unit.

To solve the problems described above, the control unit retains a predetermined renewal condition obtained by associating the specific factor value with a condition where the filter should be renewed, and controls take-up of the filter so that, when the predetermined renewal condition is determined to be satisfied based on an output of the factor detection unit, an area of the filter facing the intake aperture is renewed for a predetermined range that is smaller than an opening area of the intake aperture.

A control method for renewing a filter of a projector according to the present invention is a control method for using a projector in which an element for modulating light from a light source with a display device and enlarging and projecting an image obtained by the modulation is accommodated in a main unit housing having an intake aperture for drawing air in and an exhaust aperture for expelling air out, and a filter unit is disposed so that the filter faces the intake aperture in a predetermined area between a rolling shaft and a take-up shaft. The control method is for renewing a part of the filter facing the intake aperture by taking-up the filter from the rolling shaft onto the take-up shaft.

The control method according to the present invention includes a detection step of detecting a specific factor value relating to contamination of the filter, a comparison step of comparing the detected specific factor value with a predetermined renewal condition that corresponds to a condition where the filter should be renewed, and a renewal step of controlling take-up of the filter so that, when the predetermined renewal condition is determined to be satisfied as a result of the comparison step, an area of the filter facing the intake aperture is renewed for a predetermined range that is smaller than an opening area of the intake aperture.

Effects of the Invention

According to the present invention, at the time of renewing an area of the filter facing the intake aperture, the filter is renewed for a predetermined range that is smaller than the opening area of the intake aperture, which enables the renewal condition to be set corresponding to a lower level of contamination of the filter than in conventional cases. It is thus possible to provide a projector that reduces a noise caused by the starting sound of a fan and also reduces the change in the rotational speed of a fan between the state immediately before filter take-up and the state immediately after execution of a take-up operation, thus being less likely to cause a user discomfort through a change of sound.

Figure 1:
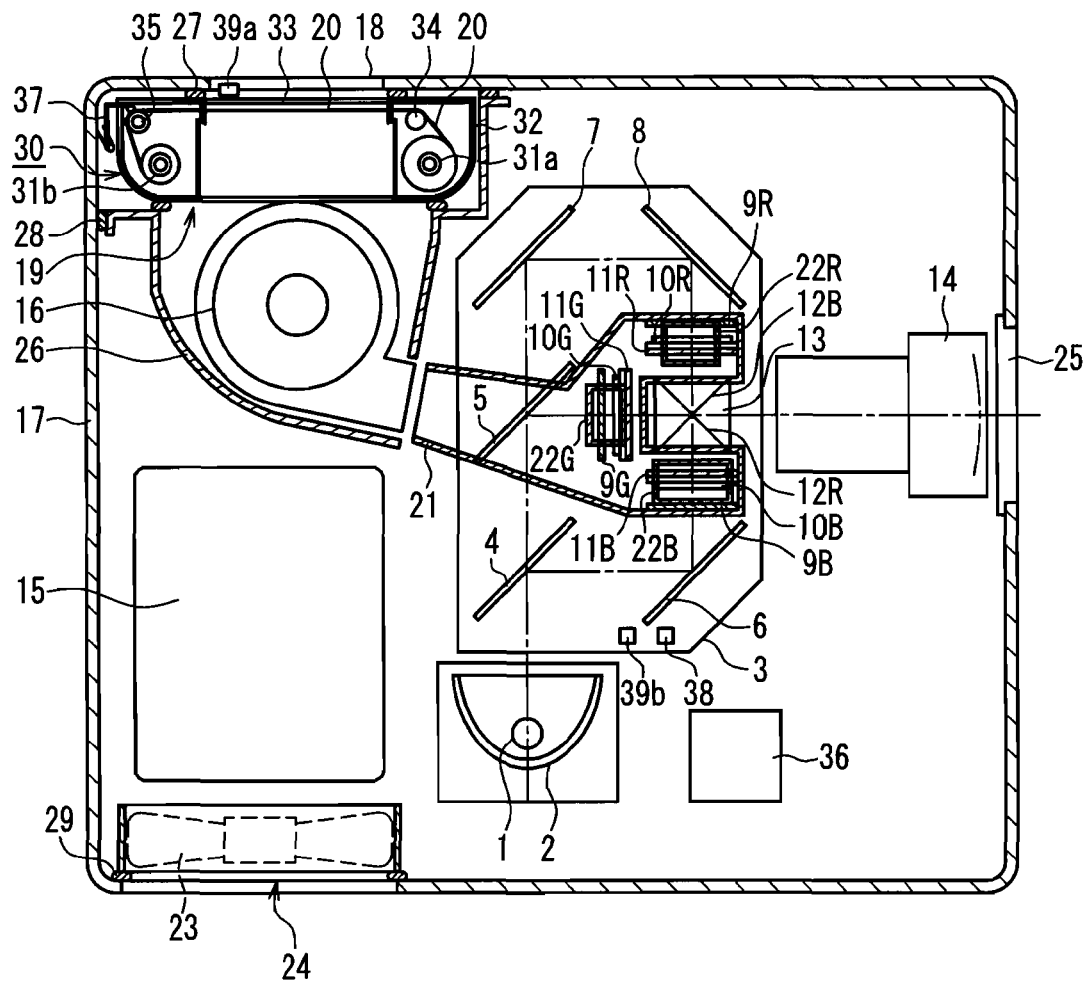
FIG. 1 is a cross-sectional view illustrating a structure of a projector according to Embodiments 1 to 3 of the present invention.

DESCRIPTION OF REFERENCE NUMERALS OR CHARACTERS 1 lamp
2 reflector
3 optical unit
4, 5 dichroic mirror
6, 7, 8 total reflection mirrors
9R, 9G, 9B incident-side polarizer
10R, 10G, 10B liquid crystal panel
11R, 11G, 11B eject-side polarizer
12R, 12B dichroic reflective films
13 combine prism
14 projection lens
15 power source unit
16 air intake fan
17 housing
18 intake aperture
19 filter unit
20 electrostatic filter
21 optical unit duct
21a wall face
22B aperture for blue channel
22G aperture for green channel
22R aperture for red channel
23 exhaust fan
24 exhaust aperture
25 window part
26 air intake duct
27, 28, 29 buffer material
30 filter cassette
31a rolling shaft
31b take-up shaft
32 cassette housing
32a bottom part
33 aperture
34 guide shaft
35 feed amount monitor shaft
36 microprocessor
37 pressing mechanism
38 temperature sensor
39a external air pressure sensor
39b internal air pressure sensor
40 exhaust temperature sensor
41 outside air temperature sensor
42 airflow sensor

DESCRIPTION OF THE INVENTION

A projector and its filter renewal control method according to the present invention can take various forms described below, based on the above-described structure.

Specifically, in the projector having the above-described structure, the factor detection unit may include a timer that measures a cumulative display time that is a cumulative time of displaying image, and the renewal condition may be a condition where the cumulative display time has reached a predetermined set value.

Further, the factor detection unit may include a detection unit that detects an environmental factor value that varies according to the contamination of a filter in the main unit housing, and the renewal condition may be a condition where the environmental factor value detected by the detection unit has reached a predetermined value. In that case, the detection unit may be composed of a temperature sensor, an air pressure sensor, or an airflow sensor.

Further, the detection unit may be composed of an exhaust temperature sensor disposed in an area where air passes through after having passed through the periphery of the display device, and an airflow sensor disposed in a position where a detected value thereof varies depending on the level of contamination of the filter, and whether or not the renewal condition has been satisfied is determined based on a combination of the value detected by the airflow sensor and the value detected by the exhaust temperature sensor.

A predetermined range of the filter to be renewed preferably may be set to be equal to or smaller than one half the opening area of the intake aperture.

The display device may be either a liquid crystal display or a DMD (digital mirror device).

In a control method for renewing a filter of a project having the above-described structure, the predetermined range of the filter to be renewed preferably may be set to be equal to or smaller than one half the opening area of the intake aperture.

Further, a cumulative display time that is a cumulative time of displaying an image may be measured in the detection step, and a predetermined set value for the cumulative display time may be used as the renewal condition in the comparison step.

Further, a value for an environmental factor that varies according to contamination of a filter in the main unit housing may be detected in the detection step, and a predetermined value for the environmental factor may be used as the renewal condition in the comparison step. In that case, the environmental factor may be at least one of the temperature, the air pressure, and the air volume.

Preferably, the detection step may include an exhaust temperature detection step of detecting an exhaust temperature that is the temperature of air that has passed through the periphery of the display device, and an air volume detection step of detecting an air volume in a position where the air volume varies according to the level of contamination of the filter; and the comparison step may include an exhaust temperature comparison step of comparing the detected exhaust temperature with a predetermined exhaust temperature reference value, and an air volume comparison step of comparing the detected air volume with a predetermined reference air volume value, wherein the air volume comparison step may be performed when the exhaust temperature is determined to be equal to or higher than the exhaust temperature reference value in the exhaust temperature comparison step, and the predetermined renewal condition may be determined to be satisfied when the air volume is determined to be lower than the reference air volume value in the air volume comparison step.

Further, the control method may include an elapsed time determination step of determining whether or not a predetermined cumulative display time that is a cumulative time of displaying an image has elapsed since a previous filter renewal, after the predetermined renewal condition was determined to be satisfied in the air volume comparison step, wherein the renewal step may be performed when a predetermined cumulative display time is determined to have elapsed in the elapsed time determination step.

Further, the control method may include a shutdown determination step of comparing the detected exhaust temperature with a shutdown reference value that is higher than the exhaust temperature reference value, prior to the exhaust temperature comparison step, wherein, when the exhaust temperature is determined to be equal to or higher than the shutdown reference value in the shutdown determination step, the air volume comparison step may be performed after execution of the renewal step, and an operation of the projector is shut down when the air volume is determined to be lower than the reference air volume value in the air volume comparison step, and the exhaust temperature comparison step may be performed when the exhaust temperature is determined to be lower than the shutdown reference value in the shutdown determination step.

Further, the detection step may include an exhaust temperature detection step of detecting an exhaust temperature that is the temperature of air that has passed through the periphery of the display device and an air volume detection step of detecting an air volume in a position where the air volume varies according to the level of contamination of the filter; and the comparison step may include an exhaust temperature comparison step of comparing the detected exhaust temperature with a predetermined exhaust temperature reference value and an air volume comparison step of comparing the detected air volume with a predetermined reference air volume value, wherein the exhaust temperature comparison step and the air volume comparison step start concurrently and the renewal step is performed when the renewal condition is determined to be satisfied in at least either one of the comparison steps.

Further, the exhaust temperature comparison step that is performed during a repetition of control after execution of the renewal step preferably may be performed after a lapse of a predetermined standby time.

Further, the control method may include a shutdown determination step of comparing the detected exhaust temperature with a shutdown reference value that is higher than the exhaust temperature reference value, prior to the exhaust temperature comparison step, wherein when the exhaust temperature is determined to be equal to or higher than the shutdown reference value in the shutdown determination step, an operation of the projector is shut down, whereas when the exhaust temperature is determined to be lower than the shutdown reference value, the exhaust temperature comparison step and the air volume comparison step are performed concurrently.

The following description explains a projector and its filter renewal control method in embodiments of the present invention with reference to the drawings.

Embodiment 1

FIG. 1 is a cross-sectional view illustrating a structure of a projector according to Embodiment 1 of the present invention. Note that FIG. 1 illustrates not only components that are employed in the present embodiment but also components that are provided in projectors with the same basic configuration according to Embodiments 2 and 3. FIG. 1 also is referred to for the explanation of those embodiments.

Light emitted from a lamp 1 of a light source is reflected in a forward direction by a reflector 2 and enters an optical unit 3. The incident light is separated into red, green, and blue light by dichroic mirrors 4 and 5 and total reflection mirrors 6, 7, and 8. Thereafter, the color lights are modulated intensely based on an input signal (not shown) from the outside by incident-side polarizers 9R, 9G, and 9B, liquid crystal panels 10R, 10G, and 10B that are display devices, and eject-side polarizers 11R, 11G, and 11B. The resulting light is combined onto one optical path by a combine prism 13 that includes dichroic reflective films 12R and 12B, and then enters a projection lens 14. The projection lens 14 is designed so as to enlarge and project images formed on the liquid crystal panels 10R, 10G, and 10B onto a screen (not shown) disposed in front of the device.

At the time of this image display, displaying black requires light from the lamp 1 to be absorbed by the incident-side polarizers 9R, 9G, and 9B and the eject-side polarizers 11R, 11G, and 11B. For this reason, these polarizers exhibit high temperatures. Meanwhile, since these polarizers are made mainly of organic materials, if not cooled to an appropriate temperature, these polarizers deteriorate, images cannot be controlled, and the polarizers become unusable.

Also, a cooling means is required to ensure image display quality since the projector includes elements that generate large amounts of heat by themselves, such as the lamp 1 that reaches a temperature as high as 1,000 degrees during illumination, peripheral mechanism parts, and a power source unit 15 for lighting the lamp 1 or image display.

Thus, in the projector, air (relatively low-temperature air) is guided into the device by an air intake fan 16 of a blowing unit through an intake aperture 18 provided at a lateral wall of a housing 17. The air drawn in by the air intake fan 16 passes through an electrostatic filter 20 of a filter unit 19 and is guided to an optical unit duct 21 disposed in close contact with a fan outlet.

An aperture for blue channel 22B, an aperture for green channel 22G, and an aperture for red channel 22R are provided in the optical unit duct 21 at corresponding positions below the incident-side polarizers 9R, 9G, and 9B, the liquid crystal panels 10R, 10G, and 10B, and the eject-side polarizers 11R, 11G, and 11B, which have been described above.

The intake air removes heat away from the incident-side polarizers 9R, 9G, and 9B, the liquid crystal panels 10R, 10G, and 10B, and the eject-side polarizers 11R, 11G, and 11B, is then blown out through the aperture for blue channel 22B, the aperture for green channel 22G, and the aperture for red channel 22R, and then expelled out by an exhaust fan 23. Through this process, the expelled air also removes heat away from the lamp 1, its peripheral mechanism parts, and the power source unit 15. Air that has reached the exhaust fan 23 passes through an exhaust aperture 24 provided in a lateral face of the housing 17 and is blown outside the device.

In such a cooling process, dust from the outside is drawn in along with the air and becomes attached to the periphery of the liquid crystal panel and the light source unit; as a result, the luminance deteriorates at an early stage and failures such as the occurrence of color irregularities in projected images occur. To prevent this, a housing structure for preventing dust from entering and a dust capture structure are employed.

Employed as the housing structure for preventing dust from entering is a structure in which the projection lens 14 is completely accommodated in the housing 17 and a window part 25 is mounted to the housing 17 without any gaps therebetween in a light transmission part. Also, buffer materials 27, 28, and 29 that do not allow air to pass are provided between the intake aperture 18 and the filter unit 19, between the filter unit 19 and an air intake duct 26, and between the exhaust aperture 24 and the exhaust fan 23, thereby sealing off the flow of air.

Employed as the dust capture structure is the filter unit 19. The filter unit 19 is composed of a filter cassette 30, a filter feeding mechanism, and a filter feed control unit.

The filter cassette 30 includes a rolling shaft 31a around which an electrostatic filter 20 in a rolled state is taken-up, a take-up shaft 31b that takes up the electrostatic filter 20, and a cassette housing 32 that accommodates these components. The cassette housing 32 has an aperture 33 between the rolling shaft 31a and the take-up shaft 31b, for passing an air through the intake aperture 18. Also, a guide shaft 34 and a feed amount monitor shaft 35 are disposed between the rolling shaft 31a and the take-up shaft 31b.

The filter cassette 30 is detachably attached to the main unit of the projector (hereinafter referred to as the "device main unit") accommodated in the housing 17. When mounted, the take-up shaft 31b is coupled to the filter feeding mechanism (not shown) in the device main unit. The take-up shaft 31b is driven and rotated by a stepping motor, etc. in the filter feeding mechanism. Also, an enclosure part for enclosing the take-up shaft 31b in the cassette housing 32 has an airtight structure except for the filter take-up aperture and prevents the leakage of dust stored at the time of operation and handling without dust scattering at the time of replacement as well.

The filter feed control unit is composed of a filter feed amount detection unit and a microprocessor 36 that is a control unit for controlling the overall operation of the projector. The filter feed amount detection unit is composed of the feed amount monitor shaft 35, a filter pressing mechanism 37, and a rotation detection unit (not shown). The filter pressing mechanism 37 functions so as to press the electrostatic filter 20 against the feed amount monitor shaft 35, along which the electrostatic filter 20 is fed, to cause the electrostatic filter 20 to be in contact with the feed amount monitor shaft 35. With this structure, the feed amount monitor shaft 35 rotates according to the feed of the electrostatic filter 20 when the electrostatic filter 20 is taken-up around the take-up shaft 31b. Thus, the feed amount monitor shaft 35 rotates a number of times that always corresponds to the amount of filter that is fed even though the time required to feed the filter a given amount changes considerably due to the change in the thickness of the electrostatic filter 20 that has been taken-up around the take-up shaft 31b in the process of taking-up the electrostatic filter 20.

The rotation of the feed amount monitor shaft 35 can be detected by, for example, configuring an end part of the feed amount monitor shaft 35 so as to protrude out of the bottom part of the cassette housing 32, providing a rotation detection reflection pattern on a lateral face of the end part, and detecting the rotation thereof using an optical pattern detection sensor not shown. This enables the amount the electrostatic filter 20 has been fed to be detected. Such a structure is well-known and a detailed description thereof is omitted.

Controlling a stepping motor (not shown) for driving the take-up shaft 31b by the microprocessor 36 based on a detection signal from the pattern detection sensor, the electrostatic filter 20 is fed and taken-up in a predetermined amount. Thereby, a renewed part of the electrostatic filter 20 is disposed over the intake aperture 18.

Note that a temperature sensor 38 is disposed in the vicinity of the lamp 1 and the liquid crystal panels 10R, 10G, and 10B, an external air pressure sensor 39a is disposed on the outside of the intake aperture 18, and an internal air pressure sensor 39b is disposed in the interior of the projector, in order to detect environmental factors that are necessary for drive-control of the air intake fan 16, the exhaust fan 23, the take-up shaft 31b, etc. However, the air pressure sensors are not used in the present embodiment.

The microprocessor 36 monitors a temperature detection output obtained by the temperature sensor 38 at every predetermined period of time and controls the rotational speeds of the air intake fan 16 and the exhaust fan 23 according to the detected temperature. Specifically, if the temperature is high, the rotational speeds of the air intake fan 16 and the exhaust fan 23 are increased so as to increase the amount of fresh air taken in, whereas if the temperature is low enough, the rotational speeds of the air intake fan 16 and the exhaust fan 23 are reduced.

The microprocessor 36 also has a function of measuring and storing the period of time the projector has been used, i.e., an image display time during which the lamp 1 has been lighted for displaying image. The measured value of this image display time is stored accumulatively as a cumulative value for the image display time up to the last time of measurement, in spite of turn-off of the lamp and interruption of the power to the projector. Thus, next time when the power is turned on and the lamp 1 is lighted for displaying image, the measurement is resumed by adding a time to the stored value of previously measured image display time. Such a cumulative value of the image display time is referred to as a cumulative display time $\Sigma t$.

The microprocessor 36 also stores a predetermined time interval between filter renewals, i.e., a time interval after the electrostatic filter 20 is taken-up to dispose a fresh face of the filter over the intake aperture 18 until the next time when the electrostatic filter 20 is again renewed according to the level of contamination (equivalent to clogging) of the electrostatic filter 20. In other words, the predetermined time interval is defined as time data representing the value of the cumulative display time $\Sigma t$ after the lapse of which the electrostatic filter 20 should be renewed, for use in coping with a condition where the amount of fresh air taken into the interior of the projector is reduced due to contamination of the electrostatic filter 20 such as the attachment of dust or dirt. This time data is referred to as a renewal reference time $\Sigma t1$.

Figure 2:
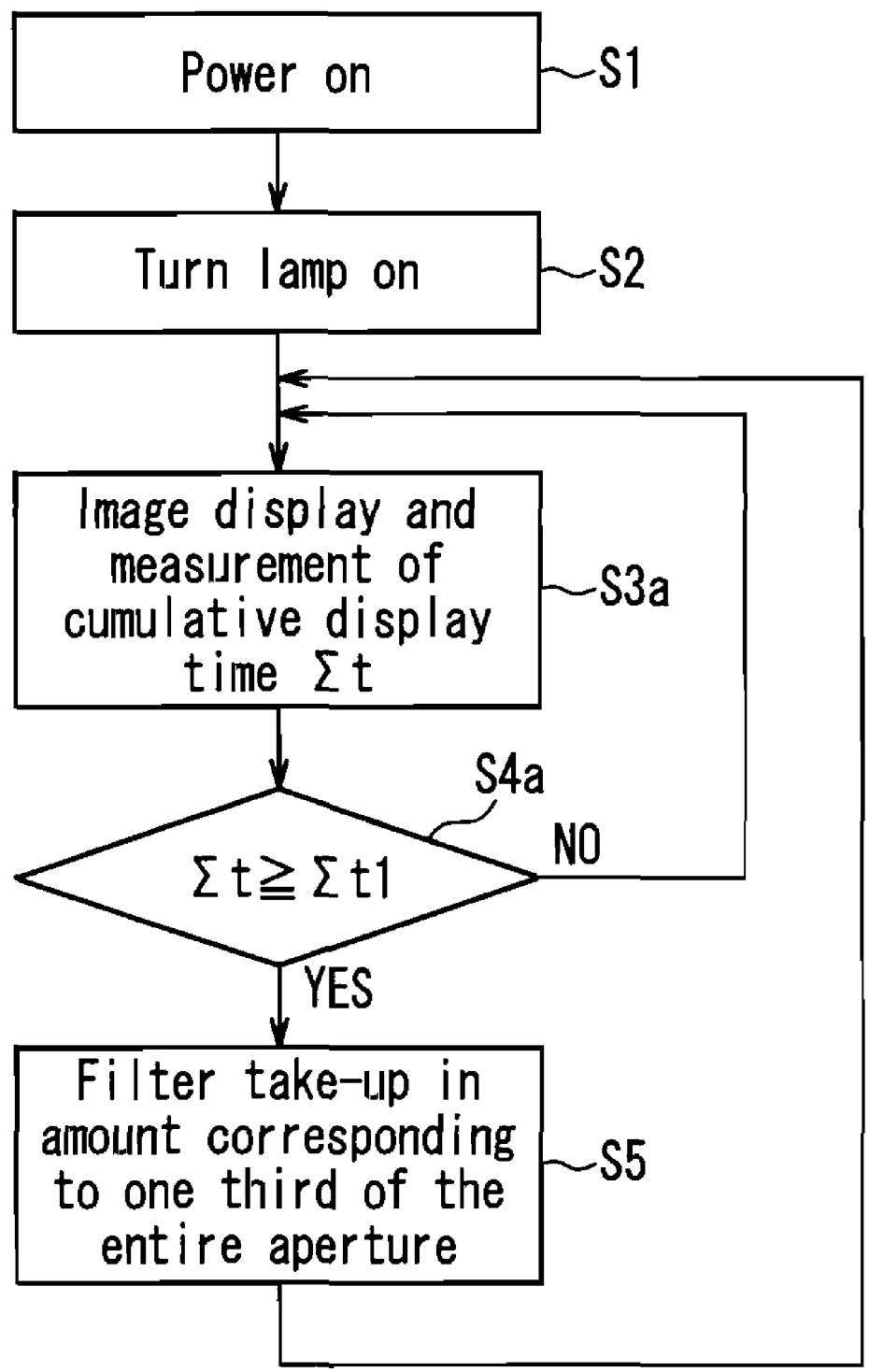
FIG. 2 is a flow chart showing a filter renewal control method according to Embodiment 1.

A filter renewal control method for the above-structured projector will be described. FIG. 2 is a flow chart showing an operation of the projector according to the present embodiment.

First of all, when the power is turned on (step S1), the lamp 1 is lighted (step S2) and an image is displayed (step S3$a$). Upon the start of image display, the air intake fan 16 and the exhaust fan 23 also start operating. Also, the microprocessor 36 measures an image display time, i.e., a cumulative display time $\Sigma t$, in step S3$a$. As described above, even though the lamp is turned off and the image display is stopped once, the next time when the power is turned on and the image display starts again, the image display time is accumulated again and is measured as the cumulative display time $\Sigma t$.

At the time of image display, air passes through the electrostatic filter 20 provided in the intake aperture 18 and is taken into the interior of the projector as fresh air. Along with this, dust or dirt become attached to the electrostatic filter 20, and the amount of fresh air taken into the interior of the projector decreases with the passage of the operation time. As a result, the internal temperature of the projector increases.

After the start of step S3$a$, the microprocessor 36 compares the cumulative display time $\Sigma t$ with the renewal reference time $\Sigma t1$ based on the measurement performed in step S3$a$ (step S4$a$). If the comparison result is $\Sigma t \geq \Sigma t1$, the take-up shaft 31$b$ is driven under the control of the microprocessor 36 so that the electrostatic filter 20 is taken-up a predetermined amount and a filtration area of the electrostatic filter 20 is renewed (step S5). The amount of filter that is taken-up is set to be a range that is smaller than the entire opening area of the intake aperture 18, e.g., one half or one third the entire opening area.

After the renewal of the filtration area of the electrostatic filter 20, the process returns to step S3$a$ where the cumulative display time $\Sigma t$ is reset to 0 in order to start the next measurement of a cumulative display time $\Sigma t$. In this way, the filtration area of the electrostatic filter 20 is renewed every time the cumulative display time $\Sigma t$ has reached the renewal reference time $\Sigma t1$.

Now, the advantage in taking-up (renewing) the filter an amount that is equivalent to one third the entire opening area is described. As a comparative example, a case where the electrostatic filter 20 is renewed by taking-up an amount that is equivalent to the entire opening area of the intake aperture 18, as in a conventional projector, is described. In this case also, it is assumed that the microprocessor 36 stores data beforehand about an elapsed time after which the electrostatic filter 20 should be taken-up for renewal, and this elapsed time is referred to as a renewal reference time $\Sigma t2$. Under the control of a conventional projector, when $\Sigma t \geq \Sigma t2$, the take-up shaft 31$b$ is driven so that the electrostatic filter 20 is taken-up for a range that is equivalent to the entire opening area of the intake aperture 18.

The renewal reference time $\Sigma t1$ according to the present embodiment is set to approximately satisfy the relation $\Sigma t2 = 3 \times (\Sigma t1)$.

Specifically, under the control of the projector according to the present embodiment, the filter is taken-up a fractional amount that is equivalent to one third the entire opening area of the intake aperture 18 after every passage of approximately one third of the time, as compared with a conventional projector in which a filter is taken-up so that a new part of the filter is disposed over the entire opening area of the intake aperture 18.

Figure 3A:
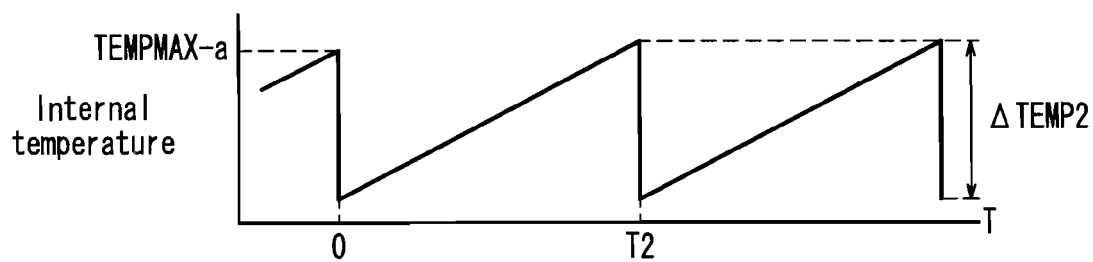
FIG. 3A is a graph showing temperature change in a device interior with respect to an elapsed image display time in a conventional projector.
Figure 3B:
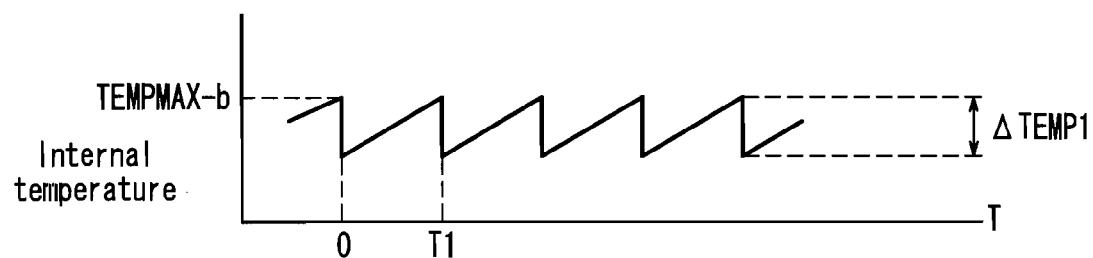
FIG. 3B is a graph showing temperature change in a device interior with respect to an elapsed image display time in a projector according to Embodiment 1.

FIG. 3A is a graph showing internal temperature change with the passage of the display time in a conventional projector. FIG. 3B is a graph showing internal temperature change with the lapse of the display time in the projector according to the present embodiment. In these figures, the horizontal axis indicates the cumulative display time $\Sigma t$, and the vertical axis indicates the internal temperature of the projector. An increase in the internal temperature represented by the vertical axis indicates a reduction in the amount of fresh air taken into the interior of the projector.

In both cases of the conventional projector and the projector according to the present embodiment, the amount of fresh air taken into the interior decreases with the lapse of time due to the attachment of dust or dirt on the electrostatic filter 20, resulting in an increase in the internal temperature.

In the case of the conventional projector, since the take-up of the filter is not performed until the cumulative display time $\Sigma t$ becomes equal to the renewal reference time $\Sigma t2$, the internal temperature of the projector reaches its maximum immediately before $\Sigma t = \Sigma t2$. The temperature at this time is referred to as TEMPMAX-a, and a difference between this TEMPMAX-a and the temperature that has been measured immediately after the previous filter take-up is referred to as $\Delta$TEMP2.

On the other hand, in the case of the projector according to the present embodiment, the filter is renewed only an amount that is equivalent to one third the entire opening area of the intake aperture 18 at the time when the cumulative display time $\Sigma t$ reaches the renewal reference time $\Sigma t1$. Thus, the internal temperature of the projector reaches its maximum immediately before $\Sigma t = \Sigma t1$. The temperature at this time is referred to as TEMPMAX-b, and a difference between this TEMPMAX-a and the temperature that has been measured immediately after the previous filter take-up is referred to as $\Delta$TEMP1.

Because the level of contamination of the filter immediately before renewal is lower in the case of the projector of the present embodiment than in the case of the conventional projector since $\Sigma t2 = 3 \times (\Sigma t1)$, it is found that TEMPMAX-b < TEMPMAX-a. It is also obvious that $\Delta$TEMP1 < $\Delta$TEMP2.

Under the control of the microprocessor 36, the rotational speeds of the air intake fan 16 and the exhaust fan 23 are increased according to the level of the internal temperature of the projector so as to increase the amount of air taken into the projector and the amount of air expelled from the projector, thereby lowering the temperature. Since, as described above, TEMPMAX-b < TEMPMAX-a for the internal temperature at the time when the filter is at its dirtiest, i.e., the projector of the present embodiment can suppress the internal temperature lower than the temperature in the conventional projector, as a result, the maximum noise values for the fans can be reduced.

In addition, since $\Delta$TEMP1 < $\Delta$TEMP2 for the temperature difference between the state where the filter is at its dirtiest immediately before filter take-up and the state immediately after filter take-up, the projector of the present embodiment, as compared with the conventional projector, can minimize an unpleasant change in noise caused by a sudden change in the rotational speeds of the fans before and after filter take-up.

As described above, the projector according to the present embodiment enables not only more of a reduction in the maximum value for fan noise than in the conventional projector, but also more of a reduction in the maximum value for the change in fan noise than in the conventional projector.

Moreover, even though the method of the present embodiment is employed, the total filter length to be prepared for the same display time is equivalent to the length required in the conventional projector.

Although a greater effect than that in conventional cases can be achieved if the amount of filter to be taken-up is within a range smaller than the entire opening area of the intake aperture 18; desirably, one half or one third is optimum in order to achieve a clearer effect and in terms of control.

Embodiment 2

Figure 4:
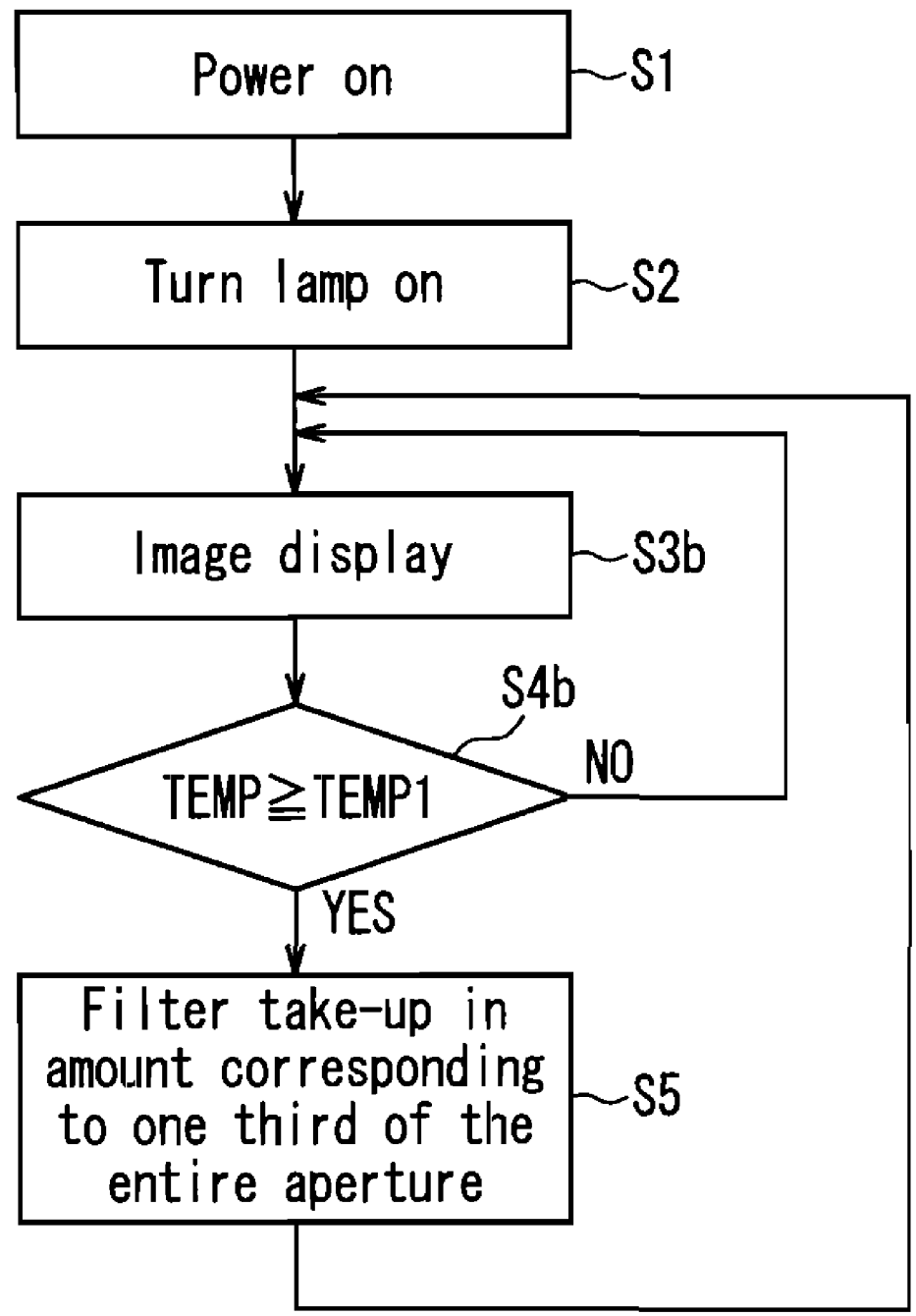
FIG. 4 is a flow chart showing a filter renewal control method according to Embodiment 2.

FIG. 4 is a flow chart showing a filter renewal control method for a projector according to Embodiment 2. The projector has a similar structure to the device illustrated in FIG. 1; the present embodiment differs from Embodiment 1 only in that the drive timing of the take-up shaft 31b is controlled by only the temperature detected by the temperature sensor 38. Accordingly, in the present embodiment, the cumulative display time is not used for filter take-up control.

In a conventional filter renewal control method for a projector as a comparative example for this case, a state where the value detected by a temperature sensor exceeds a predetermined temperature is defined to correspond to a condition where the filter is dirty or dusty. According to the state, the control is performed so that the electrostatic filter 20 is taken up, disposing a new part of the filter over the entire opening area of the intake aperture 18.

A reference temperature at which a conventional projector performs filter take-up control is referred to as a renewal reference temperature TEMP2, and a reference temperature at which the projector of the present embodiment performs filter take-up control is referred to as a renewal reference temperature TEMP1. The renewal reference temperature TEMP1 is set to be lower than the renewal reference temperature TEMP2.

The flow chart in FIG. 4 shows the operation of the projector according to the present embodiment. In FIG. 4, the temperature detected by the microprocessor 36 is represented by TEMP. Now, the operation of the projector according to the present embodiment will be described with reference to FIG. 4. Note that the same reference numbers have been given to steps that are the same as those in the control method according to Embodiment 1 illustrated in FIG. 2, and repeated descriptions thereof are omitted.

When the power is turned on (step S1), the lamp is lighted (step S2) and an image is displayed (step S3b). After the start of step S3b, the microprocessor 36 compares the detected temperature TEMP obtained by the temperature sensor 38 with the renewal reference temperature TEMP1 every predetermined period of time (step S4b). If TEMP is lower than TEMP1, the internal temperature of the projector is determined not to be increased excessively, and the process returns to step S3b to continue image display. At a time when the detected temperature TEMP becomes equal to or higher than TEMP1, the take-up shaft 31b is driven under the control of the microprocessor 36 so that the electrostatic filter 20 is taken-up for a range that is smaller than the entire opening area of the intake aperture 18, e.g., one half or one third the entire opening area (step S5).

Specifically, unlike in a conventional projector in which the filter is renewed so that the entire opening area of the intake aperture is covered with a new part of the filter, the projector according to the present embodiment takes up the filter a fractional amount that is equivalent to, for example, one third of the entire opening area of the intake aperture 18 as in the control method for the projector according to Embodiment 1.

After the renewal of the filtration area of the electrostatic filter 20, the process returns to step S3b to continue image display, and the microprocessor 36 repeats step S4b where the detected temperature TEMP obtained by the temperature sensor 38 and the renewal reference temperature TEMP1 are compared at each predetermined period of time. In this way, the filtration area of the electrostatic filter 20 is renewed every time the detected temperature TEMP has reached the renewal reference temperature TEMP1.

Like the filter renewal control method for the projector according to Embodiment 1, the control method according to the present embodiment enables not only more of a reduction in the maximum value for fan noise than in conventional projectors, but also more of a reduction in the maximum value of the change in fan noise than in conventional projectors. In addition, even though this method has been employed, the total filter length to be prepared can be equivalent to the total filter length in conventional projectors.

As in Embodiment 1, the amount of filter that is taken-up at the time of each renewal preferably may be equal to or smaller than one half of the entire opening area of the intake aperture 18; desirably, one half or one third is optimum.

Embodiment 3

Figure 5:
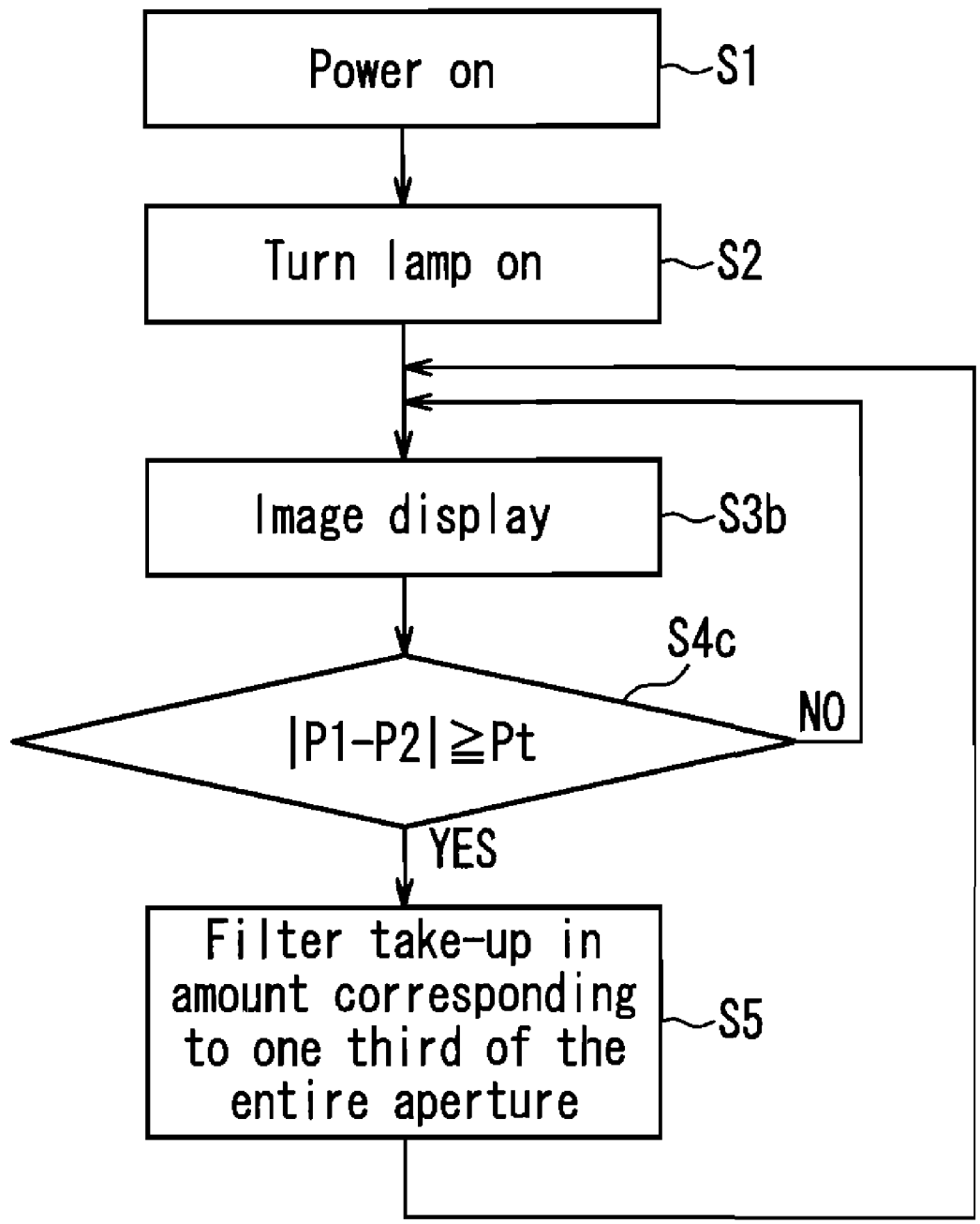
FIG. 5 is a flow chart showing a filter renewal control method according to Embodiment 3.

Next, a filter renewal control method for a projector according to Embodiment 3 of the present invention will be described with reference to the flow chart in FIG. 5. The projector has a similar structure to the device illustrated in FIG. 1; the present embodiment differs from Embodiments 1 and 2 only in that the drive timing of the take-up shaft 31b is controlled based on the air pressures detected by the external air pressure sensor 39a and the internal air pressure sensor 39b illustrated in FIG. 1. Note that the same reference numerals are given to steps that are the same as those in the control method of Embodiment 1 in FIG. 2, and repeated descriptions thereof will be omitted.

P1 is defined as the value detected by the external air pressure sensor 39a disposed on the outer side of the intake aperture 18 in FIG. 1. P2 is defined as the value detected by the internal air pressure sensor 39b disposed in the interior of the projector. Also, as to the difference between the two air pressure sensors, ΔPt is defined as a renewal reference air pressure difference that is a threshold value for determining whether or not there is a reduction in the amount of air in the interior of the main unit housing 17.

When the power is turned on (step S1), the lamp is lighted (step S2) and an image is displayed (step S3b). The microprocessor 36 compares an absolute value |P1-P2| of the difference in air pressure between P1 and P2 with ΔPt every predetermined period of time (step S4c). If the value of |P1-P2| is lower than ΔPt, the amount of air in the interior of the projector is determined not to be decreased, and the process returns to step S3b to continue image display.

If |P1-P2|≧ΔPt, the amount of air taken in through the intake aperture 18 is determined to have decreased due to contamination of the electrostatic filter 20. In this case, the take-up shaft 31b is driven so that the electrostatic filter 20 is taken-up and a new part of the filter is disposed over the intake aperture 18 (step S5).

In a control method for a conventional projector as a comparative example for this case, if the difference between the two air pressure sensors becomes larger than the preset renewal reference air pressure difference ΔPct, the amount of air taken in through the intake aperture 18 is determined to have decreased due to contamination of the electrostatic filter 20. As a result, the operation of taking-up the electrostatic filter 20 is performed. However, under the control of this method, a renewed part of the filter is disposed over the entire opening area of the intake aperture 18.

In contrast to the renewal reference air pressure difference ΔPct in the conventional example, the renewal reference air pressure difference ΔPt in the projector according to the present embodiment is set so as to satisfy the relation ΔPt<ΔPct.

As described above, in the projector according to the present embodiment, at the time when the difference in air pressure becomes at that is lower than ΔPct, the take-up shaft 31b is driven under the control of the microprocessor 36 so that the electrostatic filter 20 is taken-up for a range that is smaller than the entire opening area of the intake aperture 18, e.g., one half or one third of the entire opening area.

That is, unlike in the conventional projector in which the filter is taken-up so that a renewed part of the filter is disposed over the entire opening area of the intake aperture 18, the projector according to the present embodiment takes up the filter a fractional amount that is equivalent to, for example, one third of the entire opening area as in the control methods for the projectors according to Embodiments 1 and 2.

This, as in the cases of Embodiments 1 and 2, enables more of a reduction in the maximum value for fan noise than in conventional projectors as well as more of a reduction in the maximum value of the change in fan noise than in conventional projectors. Even though this method has been employed, the total filter length to be prepared can be equivalent to the total filter length in conventional projectors.

As in the case of Embodiment 1, the amount of filter that is taken-up at the time of each renewal should be equal to or smaller than one third of the entire opening area of the intake aperture 18; desirably, one half or one third is optimum.

Alternatively, it is also possible to combine the structures of Embodiments 1 to 3, i.e., the structure may be obtained by combining any two or all factors selected from the cumulative display time, the detected temperature, and the detected air pressure.

Embodiment 4

Figure 6:
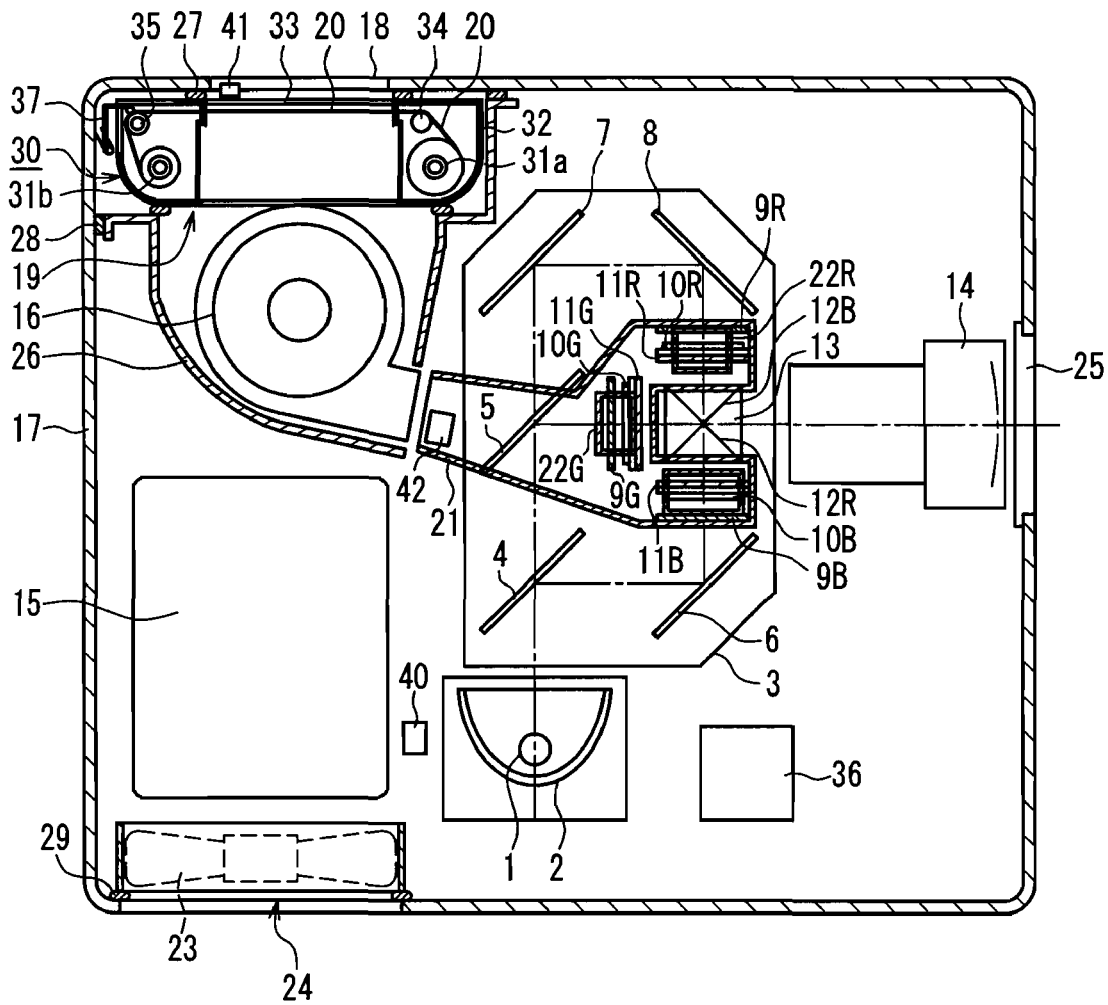
FIG. 6 is a cross-sectional view illustrating a structure of a projector according to Embodiment 4.

FIG. 6 is a cross-sectional view of a projector according to Embodiment 4. The projector basically has a similar structure to the device illustrated in FIG. 1. What is different from the structure in FIG. 1 is that an exhaust temperature sensor 40, an outside air temperature sensor 41, and an airflow sensor 42 are provided, instead of the temperature sensor 38, the external air pressure sensor 39a, and the internal air pressure sensor 39b.

The exhaust temperature sensor 40 is disposed in the vicinity of the exhaust fan 23. The exhaust temperature sensor 40 is disposed in an area where air that has passed through at least the optical unit 3 passes through. The outside air temperature sensor 41 is disposed on the outer side of the intake aperture 18. The airflow sensor 42 is disposed in the vicinity of an outlet port of the air intake fan 16. Alternatively, it is desirable that an air duct be provided for measuring the air volume and the airflow sensor 42 be mounted in that air duct.

The airflow sensor 42 may have a generally used structure, e.g., a structure that includes a heating device and a temperature sensing element opposing the heating device. That is, the airflow sensor has a structure in which a cooling effect caused by air currents varies according to the air volume, so that the air volume is detected based on a change in the detected temperature Tf° C. obtained by the temperature sensing element. In other words, the detected temperature Tf° C. corresponds to the air volume. Thus, the air volume detected by the airflow sensor 42 is represented by Tf° C. in the following description. However, it is desirable that variations in characteristics due to the outside air temperature be compensated for based on the outside air temperature detected by the outside air temperature sensor 41. The airflow sensor may have any other structure.

The airflow sensor 42 is used to detect the level of clogging of the electrostatic filter 20. If the output of a motor that drives the air intake fan 16 is constant, the volume of air drawn in by the air intake fan 16 varies according to the level of clogging of the electrostatic filter 20. In other words, a reduction in the air volume detected by the airflow sensor 42 indicates an increase in the level of clogging of the electrostatic filter 20. The value for the above detected temperature Tf° C. that corresponds to the air volume corresponds to the level of clogging.

Figure 7:
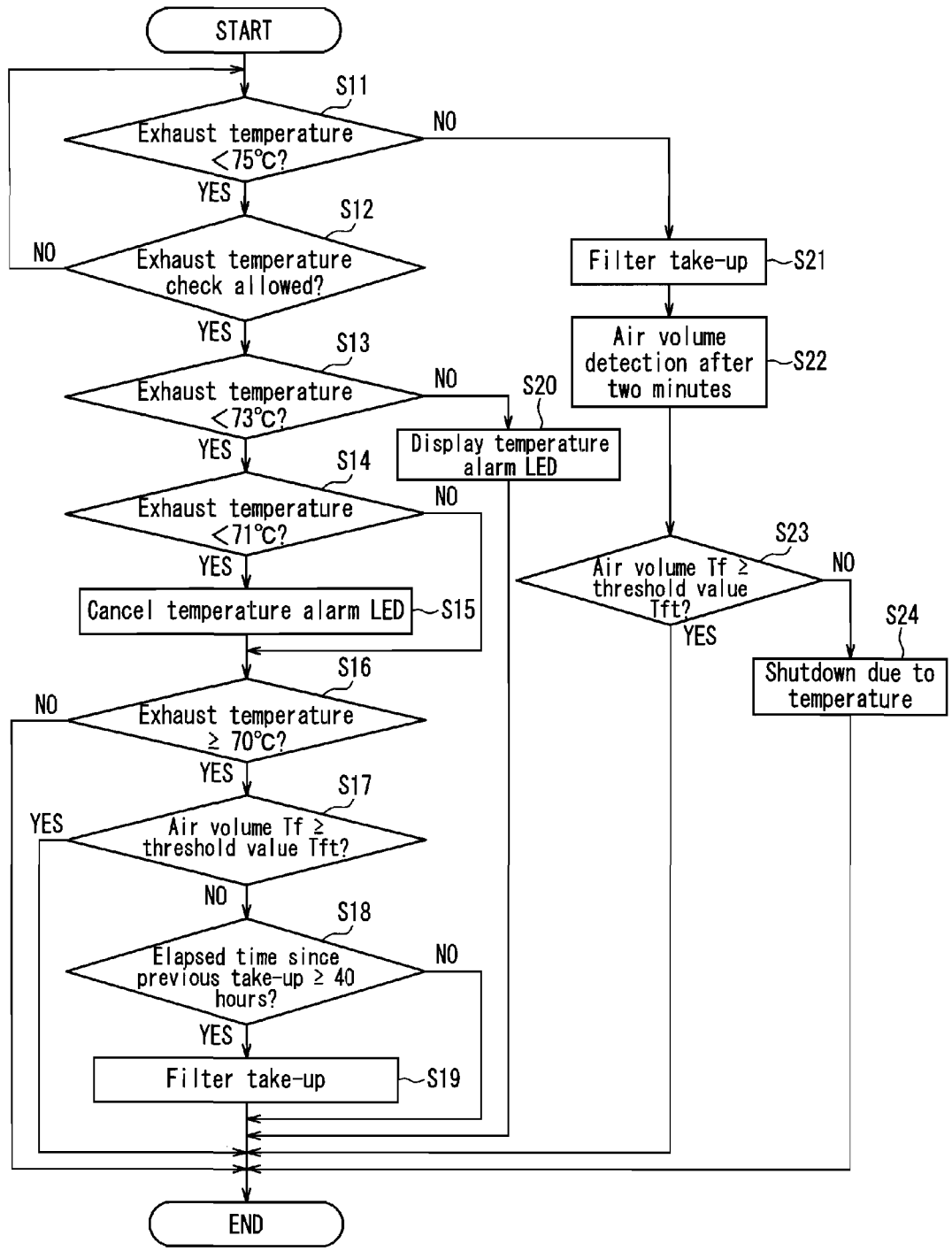
FIG. 7 is a flow chart showing a filter renewal control method according to Embodiment 4.

FIG. 7 is a flow chart showing a filter renewal control method for the projector according to the present embodiment.

Although not shown, when the power to the projector is turned on, the air intake fan 16 and the exhaust fan 23 also start operating, which initiates the following control procedure. First, in step S11, it is determined whether or not the exhaust temperature detected by the exhaust temperature sensor 40 is lower than 75° C. (a shutdown reference value). If the temperature is not lower than 75° C., the processing in step S21, which will be described later, is performed. The purpose of determining whether or not the temperature is lower than 75° C. immediately after the start of the control procedure is to protect the components of the projector in terms of temperature. If the temperature is lower than 75° C., the process goes to step S12 where it is determined whether or not an exhaust temperature check is allowed.

The exhaust temperature check is allowed when a predetermined period of time (standby time) has elapsed since power-up. If the exhaust temperature check is not allowed, the process returns to the start. This standby time is provided in order to perform an exhaust temperature check in the next step 13 after waiting for the condition that the operations of the air intake fan 16 and the exhaust fan 23, etc. have stabilized after start-up.

After the exhaust temperature check has become allowed, the process goes to step S13 where it is determined whether or not the exhaust temperature is lower than 73° C. If the temperature is not lower than 73° C., the process goes to step S20 where a temperature alarm LED display is performed, and the filter renewal control procedure returns to the start. If the temperature is lower than 73° C., the process goes to step S14 where it is determined whether or not the exhaust temperature is lower than 71° C.

If the exhaust temperature is not lower than 71° C., the process immediately goes to step S16, whereas if the exhaust temperature is lower than 71° C., the temperature alarm LED display is cancelled (step S15) and the process goes to step S16. In step S16, it is determined whether or not exhaust temperature is equal to or higher than 70° C. (an exhaust temperature reference value). If the exhaust temperature is lower than 70° C., the filter renewal control procedure returns to the start. If the exhaust temperature is either equal to or higher than 70° C., the process goes to step S17 where the air volume Tf detected by the airflow sensor 42 is compared with a predetermined threshold value Tft.

In step S17, if the air volume Tf is equal to or higher than the predetermined threshold value Tft, the filter renewal control procedure returns to the start. It the air volume is lower than the predetermined threshold value Tft, the level of clogging of the electrostatic filter 20 is determined to be fed more than a predetermined level, and the process goes to step S18. In step S18, it is determined whether or not the cumulative display time since the previous filter take-up is equal to or more than 40 hours, as a factor that is used to determine the necessity of the renewal of the electrostatic filter 20. If the cumulative display time is not more than 40 hours, the filter renewal control procedure returns to the start. If the cumulative display time is equal to or more than 40 hours, the process goes to step S19 where the electrostatic filter 20 is taken-up. The amount of filter that is taken-up is set to be within a range that is smaller than the entire opening area of the intake aperture 18 as in Embodiments 1 to 3.

If the exhaust temperature is not lower than 75° C. in step S11, the process goes to step S21 and the take-up of the electrostatic filter 20 is performed (as in step 19). The process goes further to step S22 and, after the lapse of two minutes, goes to step S23 where the air volume Tf detected by the airflow sensor 42 is compared with the predetermined threshold value Tft. If the air volume is lower than the threshold value Tft, the process goes to step S24 where the projector is shut down (shutdown due to temperature). If the air volume is equal to or higher than the threshold value Tft, the filter renewal control procedure returns to the start. Note that the reason for waiting for the lapse of two minutes in step S22 is because it takes approximately 30 seconds for the detection value of the airflow sensor 42 to stabilize after filter renewal. The time varies depending on the structure or situation of the installation of the airflow sensor 42, so that it needs to be optimized for each device.

Embodiment 5

Figure 8:
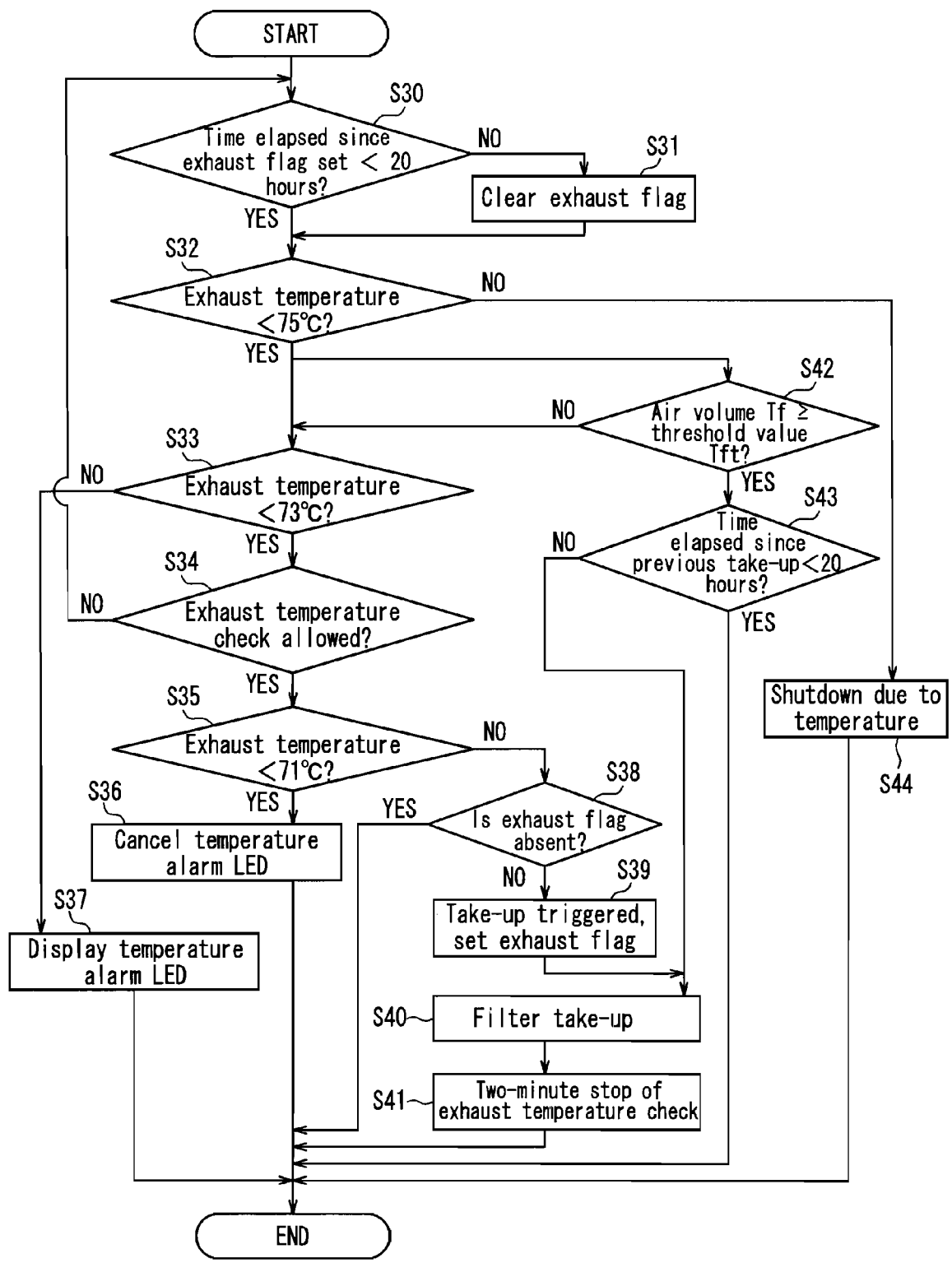
FIG. 8 is a flow chart showing a filter renewal control method according to Embodiment 5.

FIG. 8 is a flow chart showing a filter renewal control method for a projector according to Embodiment 5. The projector has a similar structure to the device according to Embodiment 4 in FIG. 6. Now, the filter renewal control method according to the present embodiment will be described.

Although not shown in FIG. 8, when the power to the projector is turned on, the air intake fan 16 and the exhaust fan 23 also start operating, which initiates the following control procedure. First, in step S30, it is determined whether or not the time elapsed since an exhaust flag has been set (the detail of which will be described later) is less than 20 hours. If the elapsed time is not less than 20 hours, i.e., if 20 hours or more have elapsed, the exhaust flag is cleared (step S31) and the process goes to step S32. If the elapsed time is less than 20 hours, the process immediately goes to step S32.

In step S32, it is determined whether or not the exhaust temperature detected by the exhaust temperature sensor 40 is lower than 75° C. (a shutdown reference value). If the temperature is not lower than 75° C., the process goes to step S44 where the projector is shut down (shutdown due to temperature). If the temperature is lower than 75° C., steps S33 and S42 are performed concurrently.

In step S33, it is determined whether or not the exhaust temperature is lower than 73° C. If the temperature is not lower than 73° C., the process goes to step S37 where a temperature alarm LED display is performed, and the filter renewal control procedure returns to the start. If the temperature is lower than 73° C., the process goes to step S34 where it is determined whether or not an exhaust temperature check is allowed. The exhaust temperature check is allowed when a predetermined period of time (standby time) has elapsed since power-up. If the exhaust temperature check is not allowed, the process returns to the start.

After step S33 and if the exhaust temperature check is determined to be allowed in step S34, the process goes to step S35 where it is determined whether or not the exhaust temperature is lower than 71° C. (an exhaust temperature reference value). If the exhaust temperature is lower than 71° C., the temperature alarm LED display is cancelled (step S36) and the filter renewal control procedure returns to the start. If the exhaust temperature is not lower than 71° C., the process goes to step S38 where the absence of the exhaust flag is checked. If the exhaust flag is not absent (the exhaust flag is present), the filter renewal control procedure returns to the start. If the exhaust flag is absent, the process goes to step S39 where the exhaust flag is set. This exhaust flag indicates that the electrostatic filter 20 has been taken-up due to an increase in the exhaust temperature.

Then, the process goes to step S40 where the electrostatic filter 20 is taken-up. The amount of filter that is taken-up is, as in Embodiments 1 to 3, set to be a range that is smaller than the entire opening area of the intake aperture 18. After the electrostatic filter 20 was taken-up, the exhaust temperature check procedure is stopped for a two-minute (step S41). After the lapse of a two-minute stopped state, the filter renewal control procedure returns to the start. The detail of such a two-minute stop of the exhaust temperature check procedure will be described in the following.

Next described is step S42 that is performed concurrently with the above-described step S33 when the exhaust temperature was determined to be lower than 75° C. in step S32. In step S42, the air volume Tf detected by the airflow sensor 42 is compared with the predetermined threshold value Tft. If the air volume Tf is lower than the predetermined threshold value Tft, the process goes to step S33 where the above-described processing is performed. Tithe air volume Tf is equal to or higher than the threshold value Tft, the process goes to step S43.

In step S43, it is determined whether or not the cumulative display time since the previous filter take-up is less than 20 hours, as a factor for determining the necessity of renewal of the electrostatic filter 20. If the cumulative display time is less than 20 hours, the filter renewal control procedure returns to the start. If the cumulative display time is not less than 20 hours, i.e., if 20 hours or more has elapsed, the process goes to step S40 where the electrostatic filter 20 is taken-up. Thereafter, the exhaust temperature check procedure is stopped for a two-minute (step S41), and then the filter renewal control procedure returns to the start.

The reason for such a two-minute stopped state of the exhaust temperature check procedure in step S41 is because consideration is given to the fact that, immediately after the take-up of the electrostatic filter 20, the response of the exhaust temperature sensor 40 has a delay from the response of the airflow sensor 42. Specifically, when the process goes from step S43 to step S40, the exhaust temperature sensor 40 cannot respond immediately and still outputs a high exhaust temperature state even though ventilation is improved by filter renewal. In such a case, if the exhaust temperature check starts immediately, the take-up of the electrostatic filter 20 is again performed due to the high exhaust temperature. In contrast to this, if a period for stopping the exhaust temperature check procedure is provided, the occurrence of such a situation can be avoided.

While, according to Embodiment 4, the cumulative display time applied for the determination of step S18 in FIG. 7 is set to be 40 hours, the cumulative display time applied for the determination of step S43 in FIG. 8 is set to be 20 hours in Embodiment 5. Such a difference indicates that the set time can be optimized according to the environment and is not limited to the examples described above. This set time determines the operation of suspending the control procedure based on the detected value, performed by the airflow sensor 42. Such a suspension time is set so as to correspond to the cumulative display time until a renewed filter becomes a predetermined clogged state due to its contamination. The cumulative display time until clogging of the filter varies depending on the environment where the projector is used; for example, the set value may be one hour under certain circumstances.

Although the above embodiments describe the case of using a liquid crystal projector, the display device is not limited to liquid crystal displays; the present invention is also applicable to the case of using a DMD in a similar way.

Industrial Applicability

The present invention reduces a noise occurring during the driving of fans or a change in noise caused by a change in the rotational speeds of the fans, which are associated with a process of automatically renewing a filter facing an intake aperture, according to contamination of the filter during usage. The present invention is thus useful in projectors using liquid crystal displays or DMDs.

The invention claimed is:

1. A projector comprising:
a light source;
a display device that modulates incident light;
an optical projection system that causes light from the light source to enter the display device and enlarges and projects an image modulated by the display device;
a main unit housing that accommodates the light source, the display device, and the optical projection system and has an intake aperture and an exhaust aperture;
a blowing unit for drawing air in through the intake aperture and expelling the air out through the exhaust aperture;
a filter unit disposed in the main unit housing so that a filter faces the intake aperture in a predetermined area between a rolling shaft and a take-up shaft, and having a structure in which a part of the filter facing the intake aperture is renewed by taking-up the filter from the rolling shaft onto the take-up shaft;
a factor detection unit that detects environmental factor values that vary according to contamination of the filter and outputs the environmental factor values; and
a control unit that controls operations of the light source, the display device, the blowing unit, and the filter unit,
wherein the factor detection unit is comprises an exhaust temperature sensor disposed in an area where air passes through after having passed through a periphery of the display device, and an airflow sensor disposed in a position where a detected air flow value varies according to the level of contamination of the filter,
the control unit retains a predetermined renewal condition represented by a combination of an exhaust temperature reference value and a reference air volume value, and
the control unit compares an air volume detected by the airflow sensor with the reference air volume value when an exhaust temperature detected by the exhaust temperature sensor is determined to be equal to or higher than the exhaust temperature reference value, thereby determining the predetermined renewal condition to be satisfied when the air volume is determined to be lower than the reference air volume, and controls take-up of the filter so that, when the predetermined renewal condition is determined to be satisfied, an area of the filter facing the intake aperture is renewed for a predetermined range that is smaller than an opening area of the intake aperture and has a constant ratio with respect to the opening area of the intake aperture.

2. The projector according to claim 1, wherein
the factor detection unit includes a timer that measures a cumulative display time that is a cumulative time of displaying image, and
the renewal condition is determined by a combination of the environmental factor values and a condition where the cumulative display time has reached a predetermined set value.

3. The projector according to claim 1, wherein the predetermined range of the filter to be renewed is set to be equal to or smaller than one half of an opening area of the intake aperture.

4. The projector according to claim 1, wherein the display device is either a liquid crystal device or a DMD (digital mirror device).

5. A control method for renewing a filter of a projector,
the projector comprising an element for modulating light from a light source with a display device and enlarging and projecting an image obtained by the modulation; a main unit housing accommodating the element and having an intake aperture for drawing air in and an exhaust aperture for expelling air out; and a filter unit disposed in the main unit housing so that a filter faces the intake aperture in a predetermined area between a rolling shaft and a take-up shaft,
a part of the filter facing the intake aperture being renewed by taking-up the filter from the rolling shaft onto the take-up shaft,
the control method comprising:
a detection step of detecting an environmental factor value that varies according to contamination of the filter;
a comparison step of comparing the detected environmental factor value with a predetermined renewal condition that corresponds to a condition where the filter should be renewed; and
a renewal step of controlling take-up of the filter so that, when the predetermined renewal condition is determined to be satisfied as a result of the comparison step, an area of the filter facing the intake aperture is renewed for a predetermined range that is smaller than an opening area of the intake aperture,
wherein the detection step includes an exhaust temperature detection step of detecting an exhaust temperature that is a temperature of air that has passed through a periphery of the display device, and an air volume detection step of detecting an air volume in a position where the air volume varies according to a level of contamination of the filter,
the comparison step includes an exhaust temperature comparison step of comparing the detected exhaust temperature with a predetermined exhaust temperature reference value, and an air volume comparison step of comparing the detected air volume with a predetermined reference air volume value, and
the air volume comparison step is performed when the exhaust temperature is determined to be equal to or higher than the exhaust temperature reference value in the exhaust temperature comparison step, whereby the predetermined renewal condition is determined to be satisfied when the air volume is determined to be lower than the reference air volume value in the air volume comparison step.

6. The control method for renewing a filter of a projector according to claim 5, wherein the predetermined range of the filter to be renewed is set to be equal to or smaller than one half of the opening area of the intake aperture.

7. The control method for renewing a filter of a projector according to claim 5, wherein
a cumulative display time that is a cumulative time of displaying image is measured in the detection step, and
a predetermined set value for the cumulative display time is used, in combination with the environmental factor values, for determining the renewal condition in the comparison step.

8. The control method for renewing a filter of a projector according to claim 5, comprising:
an elapsed time determination step of determining whether or not a predetermined cumulative display time that is a cumulative time of displaying image has elapsed since a previous filter renewal, after the predetermined renewal condition has been determined to be satisfied in the air volume comparison step,
wherein the renewal step is performed when a predetermined cumulative display time is determined to have elapsed in the elapsed time determination step.

9. The control method for renewing a filter of a projector according to claim 5, comprising:
a shutdown determination step of comparing the detected exhaust temperature with a shutdown reference value that is higher than the exhaust temperature reference value, prior to the exhaust temperature comparison step,
wherein, when the exhaust temperature is determined to be equal to or higher than the shutdown reference value in the shutdown determination step, the air volume comparison step is performed after execution of the renewal step, and an operation of the projector is shut down when the air volume is determined to be lower than the reference air volume value in the air volume comparison step, and
the exhaust temperature comparison step is performed when the exhaust temperature is determined to be lower than the shutdown reference value in the shutdown determination step.

10. The control method for renewing a filter of a projector according to claim 5, wherein
the detection step includes an exhaust temperature detection step of detecting an exhaust temperature that is a temperature of air that has passed through a periphery of the display device, and an air volume detection step of detecting an air volume in a position where the air volume varies according to a level of contamination of the filter,
the comparison step includes an exhaust temperature comparison step of comparing the detected exhaust temperature with a predetermined exhaust temperature reference value, and an air volume comparison step of comparing the detected air volume with a predetermined reference air volume value,
the exhaust temperature comparison step and the air volume comparison step start concurrently; and
the renewal step is performed when the renewal condition is determined to be satisfied in at least either one of the comparison steps.

11. The control method for renewing a filter of a projector according to claim 10, wherein the exhaust temperature comparison step that is performed during a repetition of control after execution of the renewal step is performed after a lapse of a predetermined standby time.

12. The control method for renewing a filter of a projector according to claim 10, comprising:
a shutdown determination step of comparing the detected exhaust temperature with a shutdown reference value that is higher than the exhaust temperature reference value, prior to the exhaust temperature comparison step,
wherein when the exhaust temperature is determined to be equal to or higher than the shutdown reference value in the shutdown determination step, an operation of the projector is shut down, whereas when the exhaust temperature is determined to be lower than the shutdown reference value, the exhaust temperature comparison step and the air volume comparison step are performed concurrently.

* * * * *